United States Patent
Hatch

(10) Patent No.: US 7,959,840 B2
(45) Date of Patent: Jun. 14, 2011

(54) METHOD OF CONSTRUCTING A LOW TORQUE SHAFT SEAL

(75) Inventor: Frederick R. Hatch, Ann Arbor, MI (US)

(73) Assignee: Federal Mogul Corporation, Southfield, MI (US)

(*) Notice: Subject to any disclaimer, the term of this patent is extended or adjusted under 35 U.S.C. 154(b) by 49 days.

(21) Appl. No.: 12/482,562

(22) Filed: Jun. 11, 2009

(65) Prior Publication Data

US 2009/0309261 A1 Dec. 17, 2009

Related U.S. Application Data

(60) Provisional application No. 61/061,366, filed on Jun. 13, 2008.

(51) Int. Cl.
*B29C 45/14* (2006.01)

(52) U.S. Cl. ........ 264/263; 264/261; 264/275; 264/273; 264/229; 264/231; 264/346; 264/236; 264/237; 264/347; 264/DIG. 67; 425/DIG. 47

(58) Field of Classification Search .................. None
See application file for complete search history.

(56) References Cited

U.S. PATENT DOCUMENTS

| | | | |
|---|---|---|---|
| 2,951,721 A | 9/1960 | Asp | |
| 3,013,307 A | 12/1961 | Rhoads et al. | |
| 3,079,632 A | 3/1963 | Peickii | |
| 3,259,963 A | 7/1966 | White | |
| 3,443,817 A * | 5/1969 | Reiling | 277/570 |
| 3,929,341 A | 12/1975 | Clark | |
| 4,470,605 A * | 9/1984 | Deuring | 277/309 |
| 4,526,383 A * | 7/1985 | Fuchs et al. | 277/575 |
| 4,578,856 A | 4/1986 | Butler | |
| 4,995,621 A * | 2/1991 | Devouassoux et al. | 277/402 |
| 5,183,271 A * | 2/1993 | Wada et al. | 277/351 |
| 6,079,715 A | 6/2000 | Johnen et al. | |
| 6,183,443 B1 | 2/2001 | Kratoska et al. | |
| 6,921,088 B2 | 7/2005 | Lineton | |
| 7,010,844 B2 | 3/2006 | Pekarsky et al. | |
| 2004/0160016 A1 * | 8/2004 | Hatch | 277/551 |
| 2006/0292324 A1 | 12/2006 | Roberts | |
| 2007/0044906 A1 | 3/2007 | Park | |
| 2007/0057472 A1 | 3/2007 | Hatch | |
| 2008/0010827 A1 * | 1/2008 | Hatch | 29/888.3 |

FOREIGN PATENT DOCUMENTS

DE 19819559 * 11/1999
KR 10 2005 0105216 A 11/2005

OTHER PUBLICATIONS www.SEALSCIENCE.com, Seal Science, Inc., PTFE Seal Guide, 2006.

* cited by examiner

*Primary Examiner* — Edmund H. Lee
(74) *Attorney, Agent, or Firm* — Robert L. Stearns; Dickinson Wright, PLLC

(57) ABSTRACT

A method of constructing a shaft seal assembly includes attaching a PTFE seal element to an outer metal case and disposing a bore of the PTFE seal element onto a mandrel. Then, heating the PTFE seal element while on the mandrel. Further, cooling the PTFE seal element while on the mandrel and, removing the shaft seal assembly from the mandrel. The resulting seal element provides a reliable seal against a running surface of a shaft in use, while at the same time producing low running torque against the running surface of the shaft. Further, a minimal axial push force is required to install the shaft seal assembly onto the shaft, thereby reducing the potential of damage to the seal element or inversion of the seal element during installation.

15 Claims, 3 Drawing Sheets

METHOD OF CONSTRUCTING A LOW TORQUE SHAFT SEAL

CROSS-REFERENCE TO RELATED APPLICATION

This application claims the benefit of U.S. Provisional Application Ser. No. 61/061,366, filed Jun. 13, 2008, which is incorporated herein by reference in its entirety.

BACKGROUND OF THE INVENTION

1. Technical Field

This invention relates generally to seal assemblies, and more particularly to rotary shaft seal assemblies and their method of construction.

2. Related Art

Shaft seals are commonly used throughout numerous types of vehicle applications. Aside from the shaft seal establishing a reliable seal against a rotating shaft, both to prevent the ingress of contamination and the egress of desirable lubrication, it is desirable that the seal provide a minimal running torque against the shaft. A reduced running torque of the seal helps to enhance the overall fuel economy of the vehicle, as lower torque requires less parasitic horse power to turn the shaft, such as a crankshaft, for example, due to less drag produced by the shaft seal against the running surface of the shaft. It is also desirable that the seal be relatively easy to install over an end of the shaft upon which it rides and onto the shaft with minimal push-on force. Further, it is desirable that the seal be installed onto the shaft without having the seal lip becoming damaged and/or inverted. Of course, if made too easy, a tradeoff may be made with the ability of the seal lip to maintain a reliable seal against the running surface of the shaft. Accordingly, continual efforts are made to attain the desired aspects of seal assembly, while at the same time avoiding negatively impacting the ability of the seal to maintain a reliable seal against the running surface of the shaft in use.

SUMMARY OF THE INVENTION

A method of constructing a shaft seal assembly is provided. The method results in the seal assembly having a seal lip that is optimally sized to provide a reliable seal against a running surface of a shaft in use. Further, the method provides the seal assembly with a low running torque against the running surface of the shaft. Further yet, the method results in a minimal axial push force required to install the seal assembly onto the shaft, thereby reducing the potential of damaging the seal lip during installation of the seal assembly onto the shaft. The method includes placing a metal case and a PTFE seal element into a mold cavity in spaced, detached relation to one another. Then, injecting an elastomer material into the mold cavity and attaching the metal case to the PTFE seal element with the elastomer material to form a unitized shaft seal assembly. Then, removing the shaft seal assembly from the mold cavity and disposing a bore of the PTFE seal element about a mandrel and heating the PTFE seal element while on the mandrel. Further, cooling the PTFE seal element while on the mandrel, and then, removing the shaft seal assembly from the mandrel.

In accordance with another aspect of the invention, a method of constructing a shaft seal assembly includes attaching a PTFE seal element to an outer metal case and disposing a bore of the PTFE seal element onto a mandrel. Then, heating the PTFE seal element while on the mandrel. Further, cooling the PTFE seal element while on the mandrel and, removing the shaft seal assembly from the mandrel.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
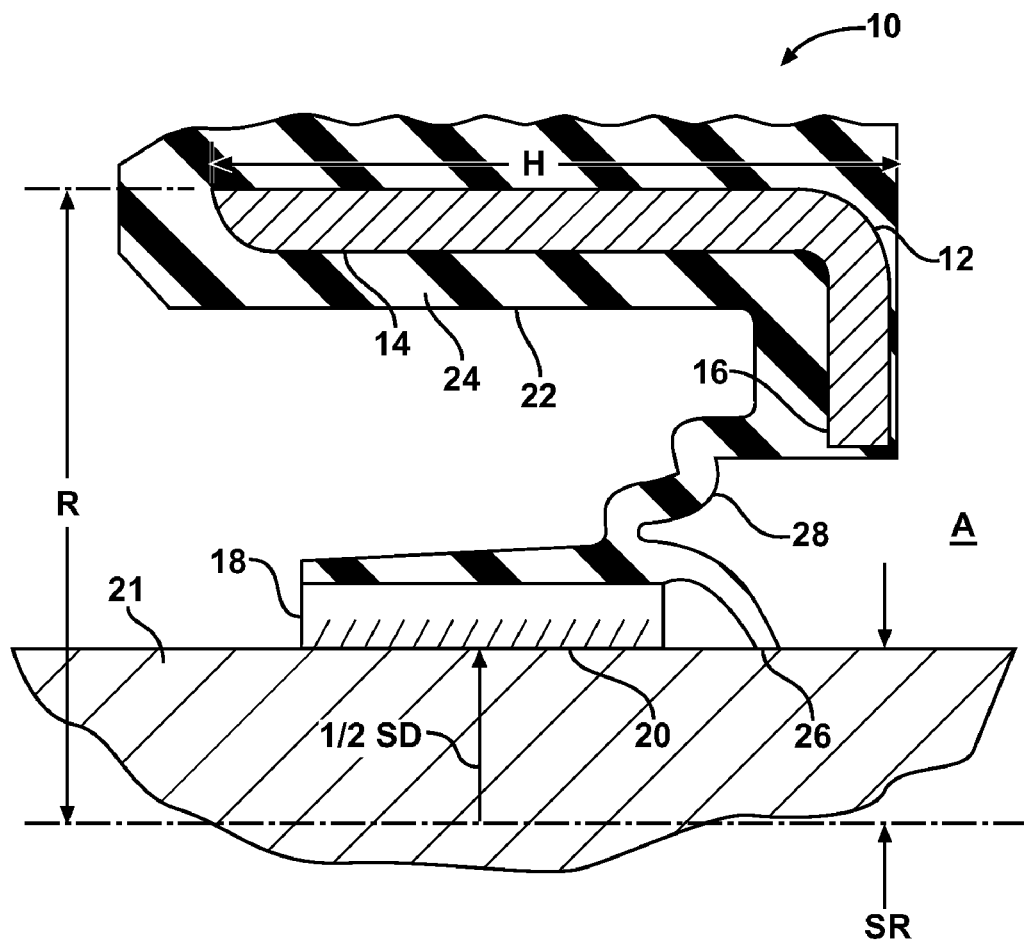
FIG. 1 is a cross-sectional view of a shaft seal assembly constructed in accordance with one aspect of the invention.

Referring in more detail to the drawings, FIG. 1 illustrates a shaft seal assembly, referred to hereafter as assembly, constructed in accordance with one aspect of the invention generally at 10. The assembly 10 has an outer metal case 12 having a predetermined height H extending parallel to a central axis 13 of the assembly 10 and a predetermined diameter D (2×R), as desired for the sealing application. The case 12 is represented here, by way of example and without limitation, as being generally L-shaped, having an outer cylindrical wall 14 and a radially inwardly extending leg 16. It should be recognized that the shape of the case 12 is not limited to the shape illustrated, and that any suitable shape is contemplated to be within the spirit and scope of the invention. The assembly 10 further includes a PTFE seal element 18. The PTFE seal element 18 has a running surface formed in a bore thereof, also referred to as a seal lip 20, for establishing a reliable seal against a running surface of a shaft 21. The assembly 10 further yet includes a body 22 molded from an elastomeric material 24, e.g. rubber, wherein the elastomeric material 24 is molded to the case 12 and to the PTFE seal element 18 to attach the PTFE seal element 18 to the elastomeric material 24 in bonded relation. The body 22 is illustrated here, by way of example and without limitation, as having an exclusion lip 26 depending toward the central axis 13 adjacent the PTFE seal element 18 to inhibit contaminants on an air side (A) of the seal assembly 10 from reaching the PTFE seal element 18. The body 22 is also shown having an undulating or wavy medial portion 28 extending annularly between the PTFE seal element 18 and the case 12 to provide the desired bias of the PTFE seal element 18 against the running surface of the shaft 21. It should be recognized, however, that the body 22 could be molded having other configurations, and thus, the invention is not limited by the configuration of the body 22 illustrated. Upon completing the method of constructing the assembly 10, the seal lip 20 of the PTFE seal element 18 attains a relaxed, unbiased diameter, such that upon installing the shaft 21 and seal assembly 10 in working relation with one another, a sealing diameter SD of the seal lip 20, wherein SD is 2 times the illustrated ½ SD, results in a reliable seal against the running surface of the shaft 21 in use, while at the same time producing low running torque against the running surface of the shaft 21. Further, the finished seal element 18 requires a minimal axial push force during installation to install the assembly 10 onto the shaft 21. As such, the potential of damage to the seal lip 20 or inversion of the seal lip 20 is minimized during installation.

Figure 2:
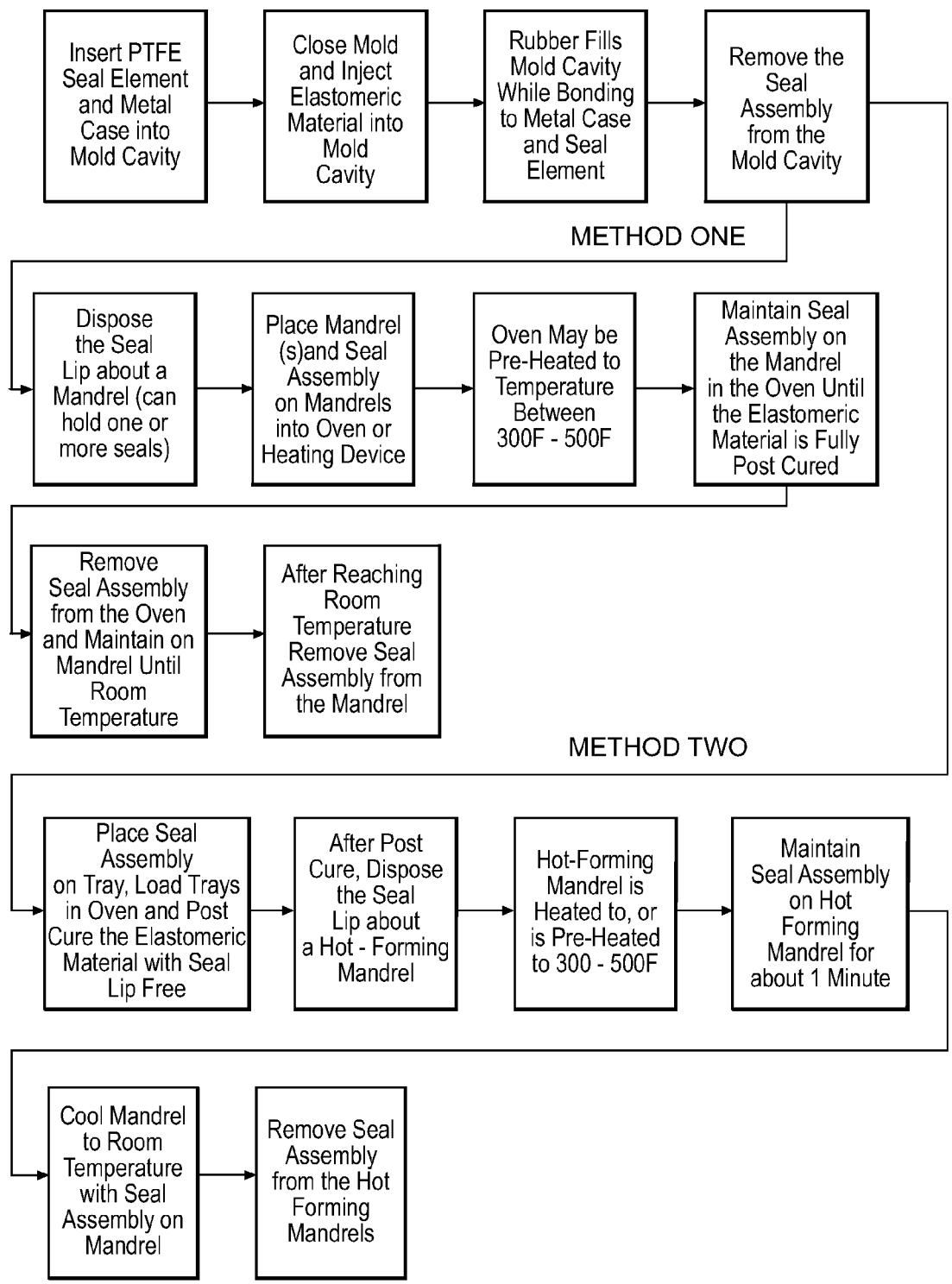
FIG. 2 is a flow diagram of presently preferred methods for constructing a shaft seal assembly in accordance with the invention.

In FIG. 2, presently preferred methods of constructing the assembly 10 are diagrammatically illustrated. Each method starts by providing both the desired configuration of a case 12 and a PTFE seal element 18, and inserting the separate case 12 and PTFE seal element 18 into a mold cavity of a mold, whereupon the PTFE seal element 18 and case 12 are fixed in spaced relation to one another. The construction process continues by enclosing the case 12 and PTFE seal element 18 within the mold cavity, such as by closing mold halves into abutment with one another. Then, the molding process is continued by injecting the desired elastomeric material 24, e.g. rubber, into the enclosed mold cavity. The elastomeric material 24, upon being injected into the mold cavity, flows about at least a portion of the case 12 and about a portion of the PTFE seal element 18, whereupon the elastomeric material 24 becomes attached to the case 12 and the PTFE seal element 18 at predetermined locations and forms the desired general configuration of the body 22. Accordingly, the body 22 is attached in bonded relation to both the PTFE seal element 18 and to the case 12 to form the initial configuration of the seal assembly 10, and thus, the PTFE seal element 18 and the case 12 are operably coupled to one another via the body 22. It should be recognized that the entire case 12 can be encapsulated by the elastomeric material 24 within the mold cavity, if desired for the intended construction of the seal assembly 10.

In accordance with one method of construction, the initial configuration of the seal assembly 10 is then removed from the mold cavity prior to the elastomeric material being cured and the seal lip 20 is disposed over a cylindrical mandrel of a predetermined diameter. The mandrel is formed of metal, such as aluminum, for example, and has a diameter the same or substantially the same as the finished sealing diameter SD desired for the intended application, wherein the sealing diameter SD is the same or substantially the same as the shaft runner surface diameter, which is 2 times the shaft radius SR. It should be recognized that a plurality of the initially configured seal assemblies 10 can be disposed on a single mandrel, if desired, thereby allowing a plurality of seal assemblies 10 to be processed in a batch at the same time. Upon disposing the seal assembly 10 about the mandrel, the PTFE seal element 18 and elastomeric material 24 are stressed and forced to remain in a temporarily stressed state. Accordingly, the bore 20 of the PTFE seal element 18 is stretched at least slightly in a radially outwardly direction in order to fit over the outer surface of the mandrel.

Next, the mandrel, with the assembly or assemblies 10 disposed thereon, is placed into an oven. The oven, with the mandrel and assemblies 10 therein, is maintained at a predetermined temperature for a predetermined amount of time, such as at a temperature between about 300-500 degrees Fahrenheit, which is below the gel range of the PTFE. The assemblies 10 are kept in the oven at the predetermined temperature until the elastomeric material 24 is fully post cured and the entire mass of the PTFE seal element 18 reaches the predetermined temperature of the oven.

Then, the assemblies 10, while still on the mandrels, are removed from the oven and cooled on the mandrel until the elastomeric material 24 and PTFE seal element 18 reach ambient room temperature, such as between about 70-100 degrees Fahrenheit. The cooling process of the assemblies 10 can be performed slowly, such as via natural cooling at room temperature, or by some rapid cooling process, such as by water quenching, for example.

Upon the assemblies 10 being cooled, the assemblies 10 are then removed from the mandrel, whereupon the PTFE seal element 18 does not return to is original pre-stressed configuration, but rather, maintains a physical set with its seal diameter SD remaining the same as or substantially the same as the diameter of the mandrel, and thus, the same or substantially the same as the running surface diameter 2(SR) of the shaft 21. It should be recognized that the seal diameter SD is preferably sized for a line-to-line fit or a slight interference fit about the shaft running diameter, thereby being able to maintain a reliable seal in use. In addition, the elastomeric material 24 is also caused to take a physical set that prevents it from returning to its fully pre-stressed configuration. For example, it has been discovered that if the heat forming process performed in the oven is performed during the post curing of the elastomeric material 24 while in its stressed configuration, the final 7% of cross-linking of the elastomeric material 24 that occurs during post cure causes the elastomeric material to take a set at a larger diameter than would occur if post cured while in a pre-stressed configuration.

The assemblies 10 are now ready for installation into a housing and onto the shaft 21 for use. With the seal lip 20 of the PTFE seal element 18 remaining in its expanded configuration, having a seal diameter SD substantially close to the outer diameter of the shaft running surface 23 upon which it is installed, the installation of the seal lip 20 over the shaft 21 is simplified, and the axial force required to push the assembly 10 onto the shaft 21 is minimized. Further, the potential for the seal lip 20 to become inverted and/or inadvertently damaged during installation is reduced. Further yet, the kinetic friction and running torque of the seal lip 20 against the running surface 23 of the shaft 21 is reduced in use.

In accordance with another method of construction, the initial configuration of the seal assembly 10, upon being removed from the mold cavity of the mold, is placed into an oven maintained at a predetermined temperature, and for a predetermined period of time suitable to post cure the elastomeric material 24. It should be recognized that in order to increase the productivity of the post curing process that more than one seal assembly 10 can be post cured at the same time. For example, a plurality of assemblies 10 can be placed into suitably sized baskets or placed on trays for insertion of the baskets or trays into the oven.

Upon the elastomeric material 24 being fully cured in the oven, the assemblies 10 are removed from the oven and bores 20 of the seal elements 18 are disposed over a mandrel or mandrels of a predetermined diameter, wherein the predetermined diameter is substantially close or the same as the desired sealing diameter SD, as described above. The mandrel can be provided as a hot forming mandrel which can be heated to, or preheated to about 300-500 degrees Fahrenheit. The assemblies are maintained on the hot form mandrels at the heated temperature 300-500° F. for a time sufficient to cause the PTFE seal element 18 to be maintained substantially in its stressed configuration by taking a physical set substantially close to the diameter of the mandrel, such as about 1 minute or more, for example.

Next, with the assemblies 10 still on the mandrel, the process continues by cooling the mandrel to about room temperature. The cooling can be performed at room temperature, or the mandrel can be cooled in an accelerated manner, such as via a cold water quench by running cold water through a hollowed core of the mandrel, for example.

Upon being brought to room temperature, such as about 70-100° F., the assemblies 10 are then ready for removal from the hot form mandrel and ready for installation into a housing and onto the shaft 21 for use, as described above.

Figure 3:
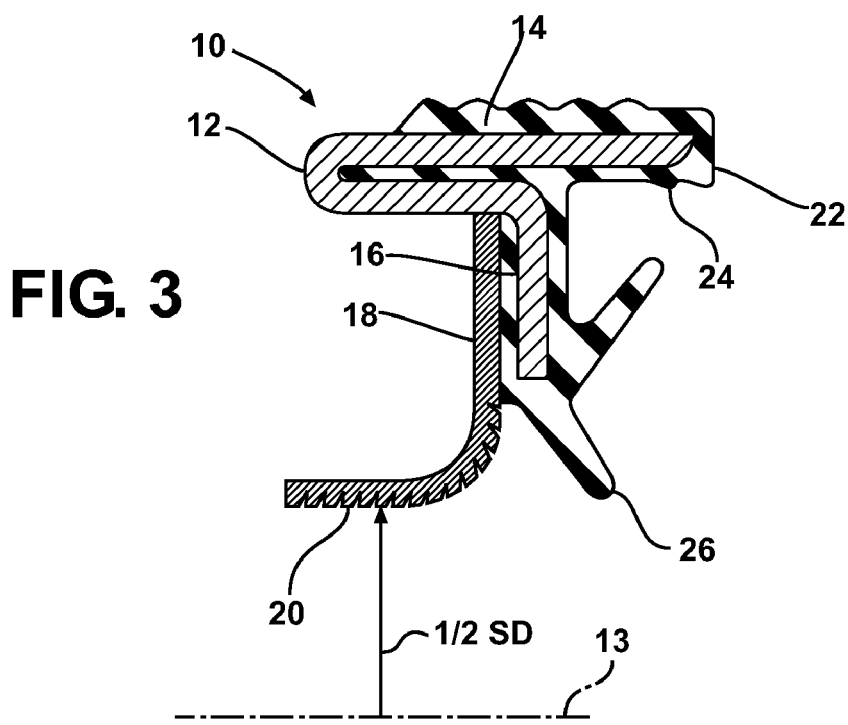
FIG. 3 is a cross-sectional view of a shaft seal assembly constructed in accordance with another aspect of the invention.
Figure 4:
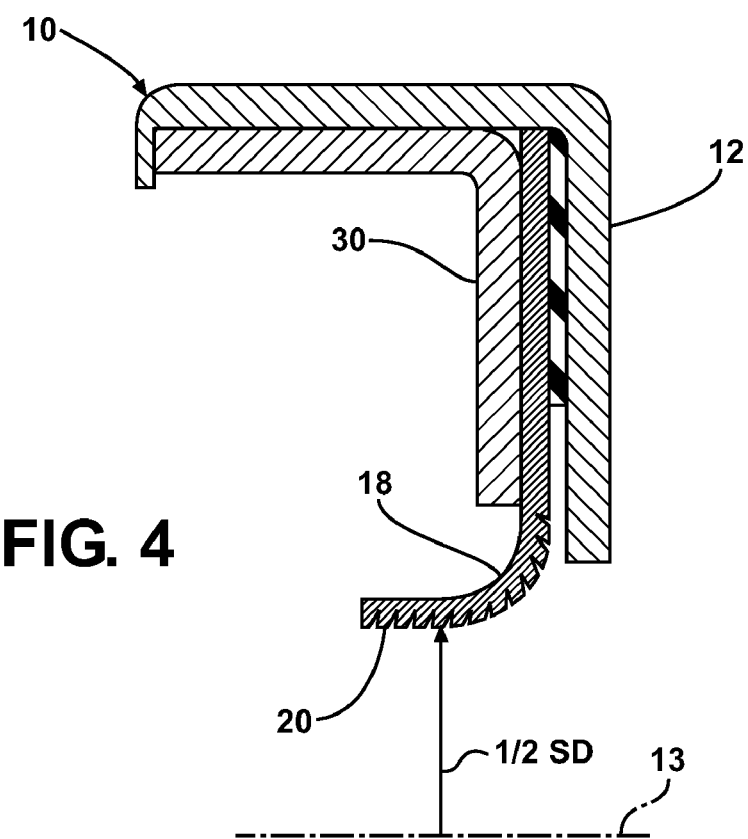
FIG. 4 is a cross-sectional view of a shaft seal assembly constructed in accordance with yet another aspect of the invention.

As noted above, the particular configuration of the case 12 and the body 22 are not limited to that illustrated in FIG. 1. For example, as shown in FIG. 3, wherein the same reference numerals are used to indicate similar features discussed above, both methods discussed and diagrammatically illustrated could be used to construct a seal assembly 10 having a case 12 with a reverse folded configuration with a PTFE seal element 18 being bonded to the case 12 via an intermediate, sandwiched layer of an elastomeric body 22. Accordingly, it should be recognized that the PTFE seal element 18 and the case 12 can be positioned within the selected mold cavity as desired to construct the configuration of seal assembly 10 desired. Further, as shown in FIG. 4, a clamped-type seal assembly 10 could have a case 12 with a PTFE seal element 18 clamped thereto via a retention member 30. In this embodiment, the method of construction is the same with regard to expanding the PTFE seal element 18 to a stressed state and then heating and cooling it thereafter to maintain the seal diameter SD of the PTFE seal element 18 substantially the same while relaxed, however, this construction does not include molding an elastomer body between the case 12 and the PTFE seal element 18, as this embodiment does not include an elastomeric body 22.

Obviously, many modifications and variations of the present invention are possible in light of the above teachings. It is, therefore, to be understood that within the scope of the appended claims, the invention may be practiced otherwise than as specifically described.

What is claimed is:

1. A method of constructing a shaft seal assembly, comprising:
    placing a metal case and a PTFE seal element into a mold cavity;
    injecting an elastomer material into the mold cavity and attaching the metal case to the PTFE seal element with the elastomer material to form a unitized initial configuration of the shaft seal assembly;
    removing the unitized initial configuration of the shaft seal assembly from the mold cavity and disposing a bore of the PTFE seal element of the removed unitized initial configuration of the shaft seal assembly onto a mandrel;
    heating the PTFE seal element of the removed unitized initial configuration of the shaft seal assembly while on the mandrel;
    cooling the PTFE seal element of the removed unitized initial configuration of the shaft seal assembly while on the mandrel; and
    removing the unitized initial configuration of the shaft seal assembly from the mandrel.

2. The method of claim 1 further including disposing the PTFE seal element onto the mandrel prior to curing the elastomer material.

3. The method of claim 2 further including curing the elastomer material while on the mandrel.

4. The method of claim 3 further including curing the elastomer material while heating the PTFE seal element.

5. The method of claim 4 further including heating the PTFE seal element to a temperature between about 300-500 degrees Fahrenheit.

6. The method of claim 1 further including placing a plurality of the seal assemblies onto the mandrel and heating the seal assemblies while on the mandrel in an oven.

7. The method of claim 1 further including curing the elastomer prior to heating the PTFE seal element on the mandrel.

8. The method of claim 7 further including curing the elastomer in an oven.

9. The method of claim 8 further including heating the mandrel to heat the PTFE seal element.

10. A method of constructing a shaft seal assembly, comprising:
    attaching a PTFE seal element to an outer metal case;
    disposing a bore of the PTFE seal element that is attached to the outer metal case onto a mandrel;
    heating the PTFE seal element that is attached to the outer metal case while on the mandrel;
    cooling the PTFE seal element that is attached to the outer metal case while on the mandrel; and
    removing the cooled PTFE seal element that is attached to the outer metal case from the mandrel.

11. The method of claim 10 further including bonding said PTFE seal element to said case with an elastomeric material.

12. The method of claim 11 further including curing the elastomer material.

13. The method of claim 12 further including disposing the PTFE seal element onto the mandrel prior to curing the elastomer material.

14. The method of claim 13 further including curing the elastomer material while heating the PTFE seal element on the mandrel.

15. The method of claim 12 further including disposing the PTFE seal element onto the mandrel and heating the PTFE seal element after curing the elastomer material.

* * * * *